United States Patent [19]
Hafendorfer et al.

[11] Patent Number: 5,964,358
[45] Date of Patent: Oct. 12, 1999

[54] TRAILER RACK TO SUPPORT LAWN CARE EQUIPMENT

[75] Inventors: James Thomas Hafendorfer, 12202 Old Shelbyville Rd., Louisville, Ky. 40243; Kenneth Gene Lininger, Jr., Mt. Washington, Ky.

[73] Assignee: James Thomas Hafendorfer, Louisville, Ky.

[21] Appl. No.: 08/901,927

[22] Filed: Jul. 29, 1997

[51] Int. Cl.[6] .................................................. A47F 7/00
[52] U.S. Cl. ........................................ 211/70.6; 211/85.18
[58] Field of Search .............................. 211/70.6, 85.18, 211/85.19, 105.1, 105.2, 117

[56] References Cited

U.S. PATENT DOCUMENTS

| | | | |
|---|---|---|---|
| 1,962,561 | 6/1934 | Hartzell | 211/70.6 X |
| 2,584,644 | 2/1952 | Verdi | 211/89.01 X |
| 3,107,636 | 10/1963 | Knight | 108/102 |
| 3,893,568 | 7/1975 | Lile | 211/70.6 X |
| 4,057,281 | 11/1977 | Garrett | 296/3 |
| 4,441,619 | 4/1984 | Gibitz | 211/70.6 |
| 4,447,049 | 5/1984 | Rudy | 211/117 X |
| 4,467,925 | 8/1984 | Ratzloff et al. | 211/70.6 |
| 4,830,242 | 5/1989 | Painter | 224/404 X |
| 4,889,377 | 12/1989 | Hughes | 296/3 |
| 5,007,568 | 4/1991 | Da Vault | 224/552 |
| 5,143,228 | 9/1992 | Arnold | 211/70.6 |
| 5,255,951 | 10/1993 | Moore, III | 296/3 |
| 5,273,337 | 12/1993 | Herrmeyer | 296/181 |
| 5,332,108 | 7/1994 | Blass | 211/105.1 X |
| 5,647,489 | 7/1997 | Bellis, Jr. | 211/70.6 |
| 5,687,856 | 11/1997 | Kendrena | 211/70.6 |
| 5,765,699 | 6/1998 | Griffin | 211/70.6 |

Primary Examiner—Daniel P. Stodola
Assistant Examiner—Erica B. Harris
Attorney, Agent, or Firm—Scott R. Cox

[57] ABSTRACT

A storage system for storing lawn and garden equipment on a trailer which includes a hinged pole locking system, locking pole system and preferably a blower rack system. The hinged pole locking system and the locking pole work together to hold lawn and garden equipment, especially string trimmers, safely and securely in place on the trailer. A blower rack system is also an element of the storage system and contains a structure which holds leaf blowers securely in position.

13 Claims, 4 Drawing Sheets

TRAILER RACK TO SUPPORT LAWN CARE EQUIPMENT

This invention relates to a storage system for equipment which is attachable to a trailer and, more particularly, it relates to a storage system secured to a trailer to support and securely hold lawn care equipment, such as string trimmers and leaf blowers.

BACKGROUND OF INVENTION

Providers of lawn care services utilize a significant amount of equipment to care for the typical lawn. This equipment includes not only lawn mowing equipment, but also accessory lawn care equipment including string trimmers and leaf blowers as well as conventional garden equipment, such as rakes and shovels. Conventionally, this equipment, including the lawn mowing equipment, is conveyed to the work site on a flat trailer bed. Conventional trailer beds do not contain attachment systems for securing the lawn care equipment to the trailer. Often the equipment is merely tossed onto the bed of the trailer where it can be damaged from movement during transportation of the equipment from one site to the next site. In addition, the accessory lawn equipment, such as string trimmers and leaf blowers, take up valuable space on the bed of the trailer which is needed to transport and store the lawn mowing equipment itself. Accordingly, a storage system for attachment to a trailer is needed to store all types of lawn care equipment and permit that equipment to be transported safely and securely from one work site to the next work site. Also, the storage system should permit the lawn care equipment to be locked securely in place to the trailer bed when not in use.

Storage racks for garden equipment secured against a conventional wall within a garage or storage shed are well known in the industry and are shown, for example, in U.S. Pat. No. 5,143,228. These support racks conventionally contain a series of tool support assemblies to which the garden equipment is attached.

Storage racks for the storage of other types of equipment, such as chain saws, which are secured to the side or back walls of a truck, are disclosed, for example, in U.S. Pat. No. 5,007,568.

A number of different types of storage racks and containers for the storage and transportation of different types of products which are secured to the bed of pickup trucks are known. For example, U.S. Pat. No. 5,255,951 discloses a folding rack which is secured to the side of a pickup truck. Different types of storage bins, which are secured within a panel truck or van, are disclosed in U.S. Pat. No. 4,889,377. Other storage tray apparatuses secured within a pickup truck or van are disclosed in U.S. Pat. No. 4,830,242. In addition, a number of different types of carrying racks which are secured to a truck or trailer are disclosed, for example, in U.S. Pat. Nos. 4,057,281 and 5,273,337.

Storage racks and storage containers secured to and on a vehicle, such as a van, pickup truck or trailer are thus well known in the art. However, specialized storage systems for storing lawn maintenance equipment safely and securely in place are not known. In addition, specialty storage racks which store lawn equipment and lock that lawn equipment in place on a trailer are not known.

Therefore, it is an object of this invention to disclose a storage rack for storing lawn care equipment.

It is a further aspect of the invention to disclose a pair of racks for storing a plurality of grass trimmers on a trailer.

It is a still further aspect of the invention to disclose a storage rack for storing leaf blowers on a trailer.

It is a still further aspect of the invention to disclose a lockable storage system which can be opened and closed easily to secure lawn equipment in place on a trailer.

It is a still further aspect of the invention to disclose a storage system for storing lawn care equipment on a trailer which can also be utilized for the storage of conventional gardening equipment.

It is a still further aspect of the invention to disclose a storage system for storing lawn and garden equipment on a trailer which also holds a cooler for liquids and a spool of additional thread for string trimmers.

It is a further aspect of the invention to disclose a storage system for storing lawn and garden equipment on a trailer which is easy to install and maintain.

These and other aspects of the invention can be obtained by the design of the lawn equipment storage rack which is disclosed by the present invention.

SUMMARY OF INVENTION

The present invention discloses a storage system for storing lawn and garden equipment on a trailer comprising a hinged pole locking system and a locking pole system. The hinged pole locking system includes a hinged locking frame which is attached by a hinge system to a first vertical pole. A locking handle, which rotates the hinged locking frame on the hinge system in relation to the first vertical pole, is secured to the hinged locking frame. As the hinged locking frame rotates about the hinge system, lawn and garden equipment held against support arms of the first vertical pole is locked securely in place on the hinged pole locking system.

Working in combination with this hinged pole locking system is the locking pole system which is comprised of a second vertical pole and a locking guide frame. The locking guide frame is pulled securely against the vertical pole by a locking control pin secured to the locking guide frame. When these two components of the system are secured together, any lawn and garden equipment stored on support bars of the locking pole system are held securely in place on the second vertical pole.

In a preferred embodiment, the invention also includes a locking blower rack system for storing leaf blowing equipment, which includes a blower support pole and a blower support locking frame which is connected to the blower support pole by a blower support locking control pin. This blower support locking control pin can be used to pull the blower support locking frame toward and against the blower support pole to lock any equipment stored on blower support arms of the blower support pole securely in place.

Other aspects of the invention include a cooler holder rack, a string trimmer spool bar, which can be secured to any of the storage poles and a tool support rack for supporting conventional gardening equipment, which can be secured between the hinged pole locking system, and the locking pole system.

These and other aspects of the invention are disclosed by its specification and further defined by the drawings.

BRIEF DESCRIPTION OF THE DRAWINGS

FIG. 2A is a perspective view of the cooler holder assembly for attachment to the hinged pole locking system.

DETAILED DESCRIPTION OF THE PREFERRED EMBODIMENT

Figure 1:
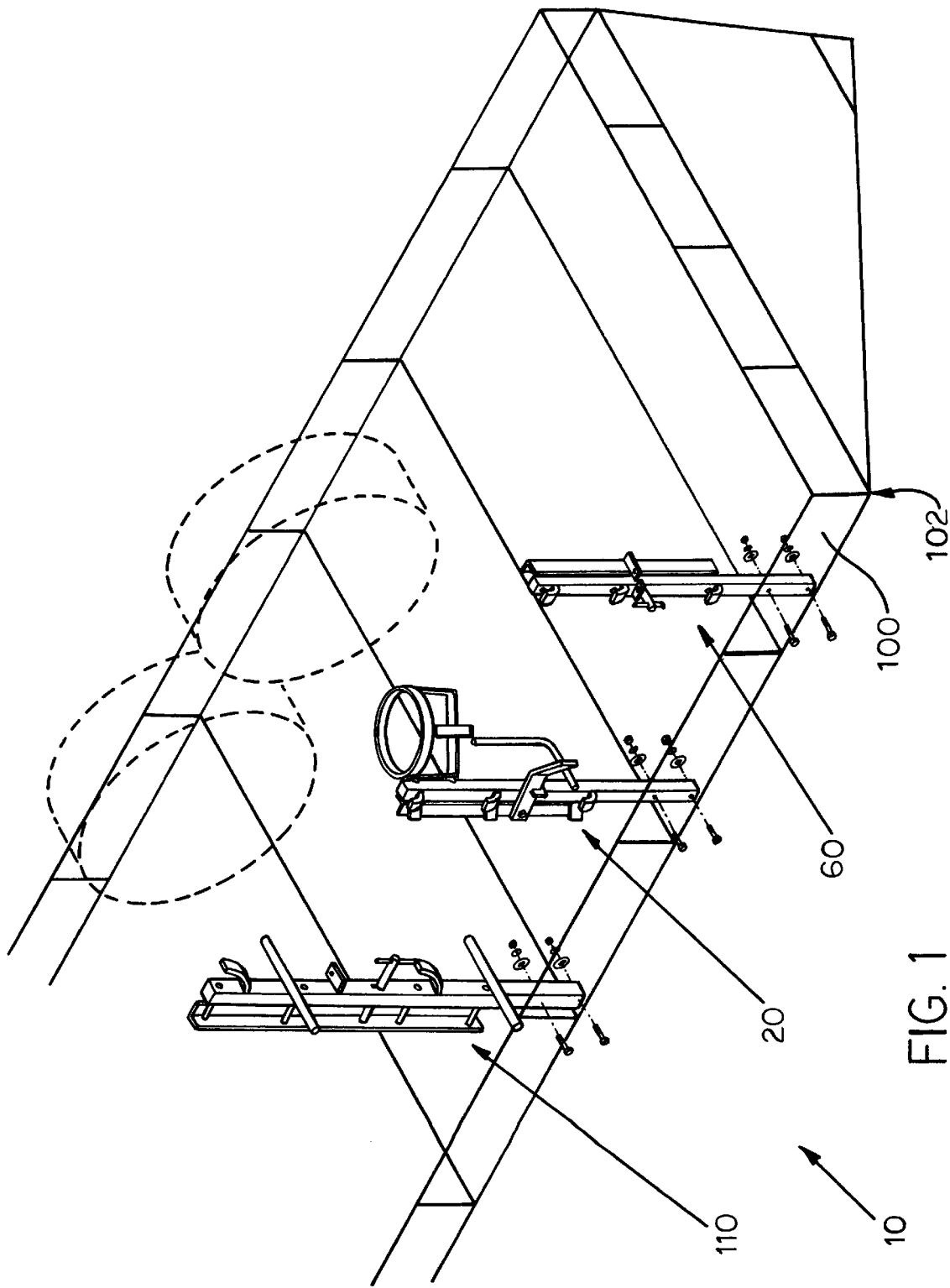
FIG. 1 is a perspective view of the storage system secured against a trailer.

The storage system (10) for storing lawn and garden equipment includes a hinged pole locking system (20) and a locking pole system (60), which works in combination to store and lock in place various types of lawn and garden equipment, particularly string trimmers, see FIG. 1. There is also included as an element of the present invention in one embodiment a locking blower rack system (110) which operates independently from the hinged pole locking system (20) and the locking pole system (60) and is designed to store and lock lawn equipment, especially, leaf blowers securely and safely on a storage trailer.

Figure 2:
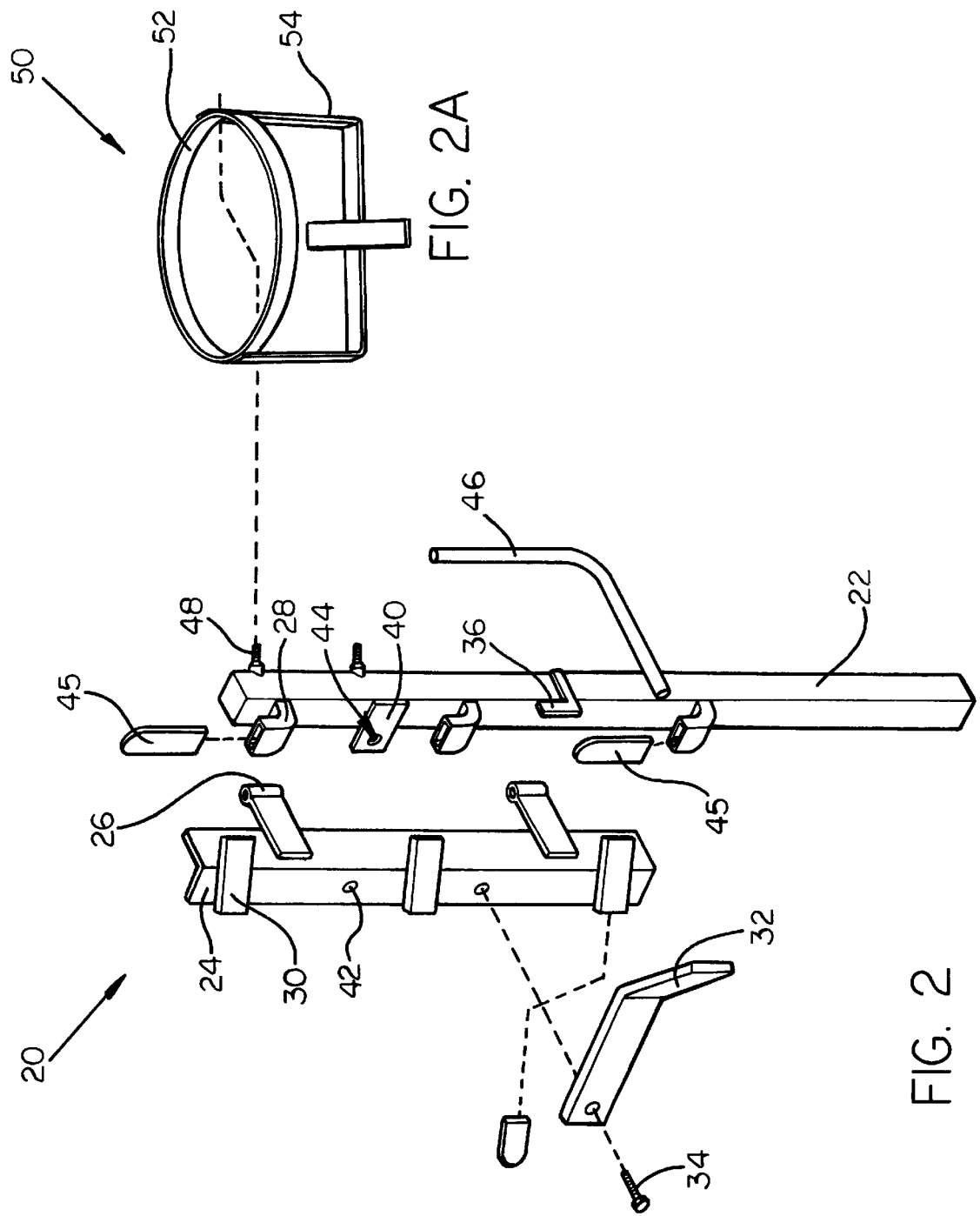
FIG. 2 is an exploded view of the hinged pole locking system.

The hinged pole locking system (20), as shown in FIG. 2, generally includes a first vertical pole (22), a hinged locking frame (24), hinges (26) of a hinge system secured to the hinged locking frame (24) for rotatably securing the hinged locking frame (24) to the first vertical pole (22), one or more support arms (28) secured to the first vertical pole (22) for supporting the lawn and garden equipment, one or more locking bars (30) secured to the hinged locking frame (24), and a locking handle (32) secured to the hinged locking frame (24) to assist in the rotation of the hinged locking frame (24) toward and away from a locked position against the first vertical pole (22).

The first vertical pole (22) is designed to be secured to the frame (100) of a trailer (102) and is secured to that frame (100) by any conventional securing system, such as by use of bolts or by welding the first vertical pole (22) to the frame (100), see FIG. 1. The first vertical pole (22) can be of any shape or height that is useful to both support the lawn and garden equipment and to secure that equipment safely to the frame (100). In one embodiment, the first vertical pole (22) is at least about 2 feet in height and preferably from about 3 to about 5 feet in height and formed from tubular steel, preferably with a square cross-section. The quality of the steel should be such as to permit the pole (22) to be secured in place and sturdy enough to support the lawn equipment being stored on the first vertical pole (22).

The hinged locking frame (24) is rotatably secured to the first vertical pole (22) by the hinges (26) of the hinge system. The hinge system includes one or more separate hinges (26) of conventional construction utilizing conventional hinge elements. The hinged locking frame (24) is constructed of conventional steel and can be of any shape or size that will cooperate with the first vertical pole (22) to hold the lawn and garden equipment safely and securely in place. In one embodiment, the hinged locking frame (24) is an L-shaped steel bar. A pair of hinges (26) of the hinge system are secured to one side of the hinged locking frame (24) and also to one side of the first vertical pole (22). This hinged locking frame (24) need not be as long as the first vertical pole (22), but should be long enough to hold all components necessary to support the lawn and garden equipment. Preferably the hinged locking frame (24) is at least about 2 feet and more preferably from about 2 to about 4 feet in length.

Secured to the hinged locking frame (24) is the locking handle (32). This locking handle (32) cooperates with the hinges (26) of the hinge system to rotate the hinged locking frame (24) from an open position to a closed position substantially against one side of the first vertical pole (22). This locking handle (32) can be of any shape or size that provides sufficient leverage to rotate the hinged locking frame (24) about the hinges (26) of the hinge system in relation to the first vertical pole (22). In one embodiment the locking handle (24) is a steel bar from about 3 to about 15 inches in length bent near one end at an angle of about 30°. In a preferred embodiment this locking handle (32) is rotatably secured to the hinged locking frame (24). Preferably the locking handle (32) is secured in place against the hinged locking frame (24) by a bolt or screw (34) which is not tightened too tightly against the hinged locking frame (24). This permits the locking handle (32) to rotate about the bolt or screw (34).

Secured to one side of the first vertical pole (22) is a slot member (36) into which the locking handle (32) can be rotated. This slot member (36) can be of any conventional shape or construction which creates an opening or slot into which the locking handle (32) can be rotated. Once the locking handle (32) is secured within the slot member (36), rotation of the hinged locking frame (24) away from the first vertical pole (22) is prevented. In addition, a locking system (not shown) secured to the slot member (36) can also be installed to prevent undesired rotation of the hinged locking frame (24) away from the first vertical pole (22).

Secured to the first vertical pole (22) are one or more support arms (28), preferably generally L-shaped support arms (28) which are designed to support and hold the lawn and garden equipment secured to the storage system (10). These support arms (28) are secured to the first vertical pole (22) by conventional means such as welding. There are one or more, and preferably, at least three such support arms (28) secured to the first vertical pole (22). Preferably, coverings (45) are placed over the support arms (28) to lessen damage to equipment stored on the support arms (28). In one embodiment, these coverings (45) are manufactured from a vinyl material and slip over the support arms (28).

In order to lock the lawn and garden equipment in place against the hinged pole locking system (20), one or more locking bars (30) are secured to the hinged locking frame (24). These locking bars (30) work in combination with the support arms (28) to hold the lawn equipment in place on the support arms (28) of the hinged pole locking system (20). These locking bars (30), are preferably relatively short, flat rectangular steel pieces secured by welding or bolts to the hinged locking frame (24). In use, these locking bars (30), secured to the hinged locking frame (24), are rotated as the hinged locking frame (24) rotates on the hinges (26) of the hinge system from an open to a closed position. When the hinged locking frame (24) is closed against the first vertical pole (22), each of the locking bars (30) is located in a position against a support arm (28). When the locking bars (30) are placed in this locked position, an opening (not shown) is created between the support arms (28) and the locking bars (30) in which the tubular portion of the lawn and garden equipment can be placed. However, this opening is not large enough for more bulky portions of the lawn and garden equipment to pass, thus locking that lawn and garden equipment in position against the hinged pole locking system (20).

Any locking arrangement, which will secure the hinged locking frame (24) against the first vertical pole (22), can be used as an alternative to, or in addition to the locking system discussed above. In one such embodiment, a single lock piece (40) is welded to one side of the first vertical pole (22). When the first vertical pole (22) and the hinged locking frame (24) are closed together, this single lock piece (40) lays flat against one side of the hinged locking frame (24). An opening (42) is provided in the hinged locking frame (24) which lines up with an opening (44) in the single lock piece (40) such that a lock passing through both openings (42, 44) securely holds the first vertical pole (22) against the hinged locking frame (24).

Additional elements may be secured to this hinged pole locking system (20) including a string trimmer spool bar (46) formed into an L-shape bar, designed to hold a string trimmer spool. In addition, bolts (48) may extend away from either the first vertical pole (22) or the hinged locking frame (24) which work in combination with other storage elements which are secured to the storage system (10). For example, a cooler holder assembly (50) can be secured to these bolts (48), see FIG. 2A. In one embodiment, this cooler holder assembly (50) is comprised of a circular metal bar (52) and a pair of support bars (54) which in combination support the bottom of a cooler, (not shown).

While the hinged pole locking system (20) can work independently to store and secure certain types of lawn and garden equipment in place, in one preferred embodiment it works in combination with the locking pole system (60) to store long, generally straight lawn equipment, such as string trimmers, securely and safely in position on a storage trailer. Alternatively, the storage system (10) may also include a pair of hinged pole locking systems (20) or locking pole systems (60) used in combination.

Figure 3:
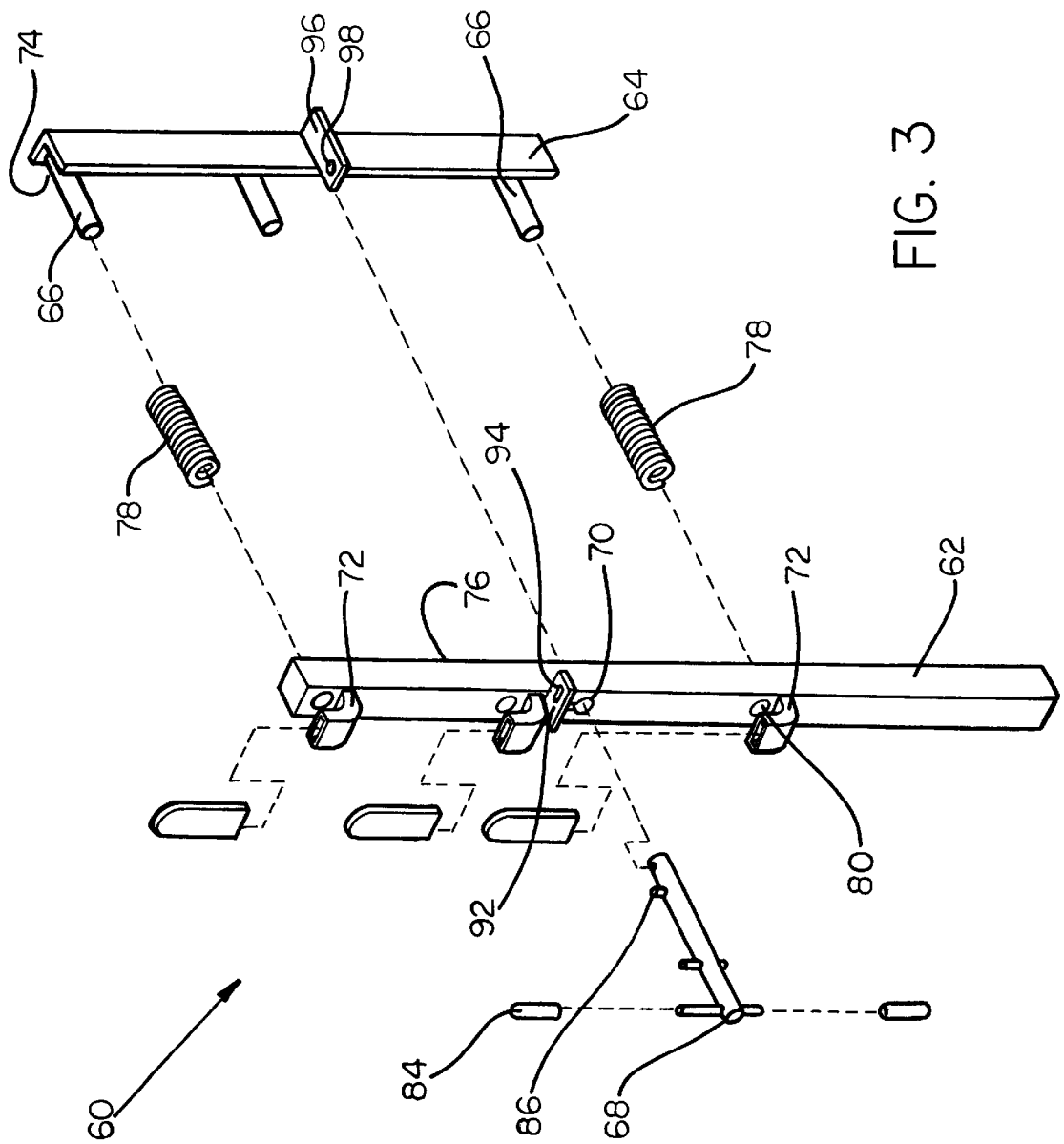
FIG. 3 is an exploded view of the locking pole system.

This locking pole system (60) may be designed of the same elements as the hinged pole locking system (20) or, alternatively, as shown in FIG. 3, it is comprised of a second vertical pole (62), a locking guide frame (64), pins (66) secured to the locking guide frame (64), a locking control pin (68) secured to the locking guide frame (64) passing through an opening (70) in the second vertical pole (62), and one or more support bars (72) secured to the second vertical pole (62) for supporting the lawn and garden equipment.

The second vertical pole (62) is similar in construction to the first vertical pole (22). The locking guide frame (64) is also similar in design to the hinged locking frame (24) of the hinged pole locking system (20). However, the method of interaction between the second locking pole (62) and the locking guide frame (64) is considerably different from that interrelationship of the elements of the hinged pole locking system (20). The locking guide frame (64), preferably L-shaped, is constructed such that one side (74) of that locking guide frame (64) is generally in a parallel position relative to one of the sides (76) of the second vertical pole (62). A series of pins (66), preferably at least two pins (66), with springs (78) secured over the pins (66) are secured to the locking guide frame (64). These pins (66) pass through openings (80) in the second vertical pole (62) to cooperate with the support bars (72), which are secured to the second vertical pole (62), to lock the lawn and garden equipment in place. The springs (78) are larger in diameter than the openings (80) in the second vertical pole (62) and are placed over the pins (66) but are maintained between the locking guide frame (64) and the second vertical pole (62), these springs encourage these two components of the locking pole system (60) apart.

The locking control pin (68), which is secured to the locking guide frame (64), passes through an opening (70) in the second vertical pole (62) and is utilized to pull the locking guide frame (64) towards the second vertical pole (62). This locking control pin (68) contains handles (84) which are placed a sufficient distance away from the second vertical pole (62) to permit the locking control pin (68) to be firmly grasped to pull the locking guide frame (64) toward and against the second vertical pole (62). The second vertical pole (62) is secured in a closed position against the locking guide frame (64) by rotating the locking control pin (68). By this rotation, a locking pin (86), an element of the locking control pin (68), is rotated out of alignment with the opening (70) in the second vertical pole (62) which thus prevents the guide frame (64) from pulling away from the second vertical pole (62).

As the locking control pin (68) is pulled, it pulls the locking guide frame (64) toward the second vertical pole (62). By this action of pulling the locking guide frame (64) toward the second pole (62), the pins (66) are also pulled through the openings (80) in the second vertical pole (62) and extend out from those openings (80) toward the side of the support bars (72).

These pins (66) operate in coordination with the support bars (72) to secure and support the lawn and garden equipment. As the pins (66) extend through the openings (80) in the second vertical pole (62), they extend closer to the respective support bars (72) and create an opening (not shown) through which tubular elements of lawn equipment, such as string trimmers, can pass. However, this opening is not large enough to permit the more bulky portions of string trimmers on either end from passing through this opening.

Various locking systems can be used to secure the second vertical pole (62) and the locking guide frame (64) together such that the lawn equipment cannot be removed from the openings formed by the pins (66) and the support arms (72). In one embodiment, a lock bar (92) with an opening (94) is secured to one side of the second vertical pole (62) and a second lock bar (96) with an opening (98) is secured to one side of the locking guide frame (64). As the locking guide frame (64) is pulled toward the second vertical pole (62), these two openings (94, 98) line up and a lock can then be placed in these openings (94, 98) to lock the respective components into a closed position.

Other components can also be added to this locking pole system (60) similar to the additional elements discussed above which are attached to the hinged pole locking system (20).

In addition, other elements can be added which will work in combination with the hinged pole locking system (20) and the locking pole system (60) to support other types of equipment. For example, a conventional tool rack (not shown) can be secured between the two elements to support conventional garden equipment, such as hoses, rakes and shovels.

Figure 4:
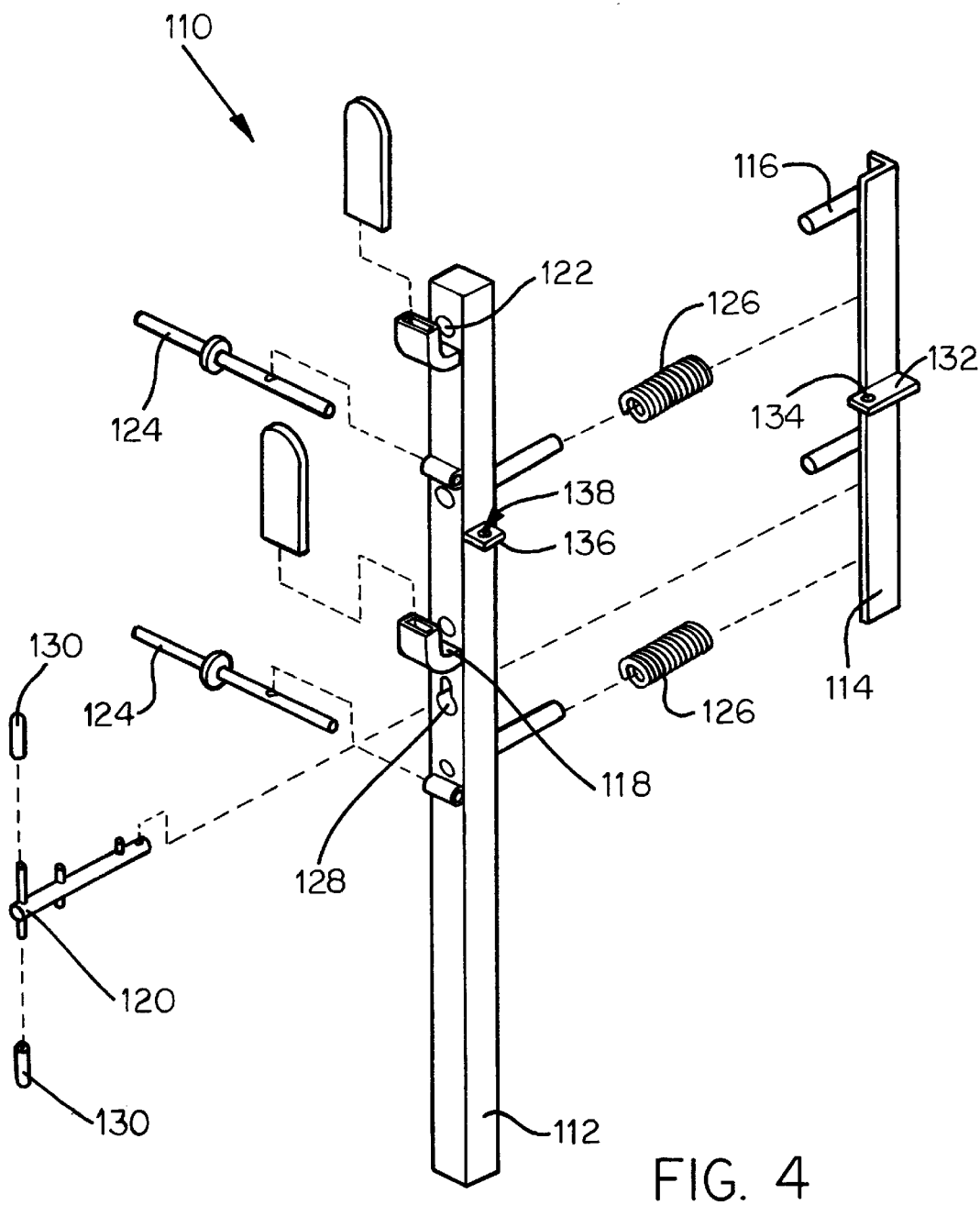
FIG. 4 is an exploded view of the blower rack system.

In addition to the hinged pole locking system (20) and the locking pole system (60), in one preferred embodiment, a locking blower rack system (110) is also secured to the trailer. This locking blower rack system (110) is designed specifically to hold leaf blowers securely and safely in position. It can be designed of a similar construction as either the hinged pole locking system (20) or the locking pole system (60). In one preferred embodiment, as shown in FIG. 4, the blower rack system (110) is designed similar to the locking pole system (60) and includes a blower support pole (112) and a blower locking frame (114).

The blower support pole (112) is similar in construction to the second vertical pole (62) and contains the same or similar elements. The blower support locking frame (114) is also similar in design to the locking guide frame (64). These two elements (112, 114) cooperatively operate in a similar way to the working relationship between the second vertical pole (62) and the locking guide frame (64). This combination of components includes one or more blower locking pins (116) which operate through openings (122) in the blower support pole (112) in conjunction with one or more blower support arms (118) to retain leaf blower equipment securely in place. Further, a blower locking control pin (120), similar in design to the locking control pin (68), is used to pull the blower support locking frame (114) toward the blower support pole (112). A similar locking apparatus to that used with the locking pole system (60) may also be provided to secure the blower support pole (112) to the blower support locking frame (114). Other components may also be secured to either the blower support pole (112) or the blower support locking frame (114) such as cross braces (124) which support a leaf blower and other support elements necessary for operation and support of the leaf blowers in position.

In operation, the hinged pole locking system (20) and the locking pole system (60) are secured to a trailer bed as shown in FIG. 1. They are placed a sufficient distance apart to support the lawn and garden equipment but not so far apart as to prevent the two components from holding the equipment securely in place, preferably from about 2 to about 4 feet apart. To store equipment such as grass trimmers, these two components (20, 60) are secured to the trailer bed by bolting or welding them in place.

To secure the lawn equipment, such as grass trimmers in position, the support arms (28) of the hinge pole locking system and the support bar (72) of the locking pole system must be placed in an open position. In order for the support arm (28) of the hinged pole locking system (20) to be available for use with the lawn equipment, the locking handle (32) must rotate the hinge locking frame (24) away from the first vertical pole (22), thus rotating the locking bars (30) away from the support arms (28).

A similar procedure is conducted with the locking pole system (60). The locking control pin (68) is rotated so that it can move freely and easily through the opening (70) in the second vertical pole (62). This releases the tension on the locking guide frame (64) which has been created by the springs (78) placed over the pins (66) pressing against both the second vertical pole (62) and the locking guide frame (64). By releasing this tension, the locking guide frame (64) moves away from the second vertical pole (62), which also operates to move the pins (66) away from the support bars (72). By this operation, both the support arms (28) of the hinge pole locking system (20) and the support bars (72) of the locking pole system (60), are available to receive the lawn equipment, such as the grass trimmer. The grass trimmer is then placed in position on the support arm (28) and the support bar (72).

To secure them tightly in position, the hinged locking frame (24) is then rotated by the locking handle (32) about the hinges (26) of the hinge system. The locking handle (32) is then secured into the slot element (36) in the hinged pole locking system (20). If desired, a lock can also be secured through the opening (44) in the single lock piece (40) and the opening (42) in the hinged locking frame (24) to secure the two components together. A cooler holder assembly (50) for a cooler is also preferably secured to bolts (48) which are secured to the first vertical pole (22). If desired, a spool of thread for the string trimmers can be secured over the string trimmer spool bar (46) which is also secured to the first vertical pole (22).

The locking pole system (60) is also placed in a closed position. To close the pins (66) against the support bars (72), the locking control pin (68) is pulled away from the second vertical pole (62) which draws the locking guide frame (64) close to or against the second vertical pole (62). This action extends the pins (66) through the openings (80) in the second vertical pole (62) to create the openings to hold the equipment securely in place. If desired, a lock is placed through openings (94, 98) in locking bars (92, 96) which are elements of the locking pole system (60).

In one preferred embodiment, a blower rack system (110) is also secured to the trailer. Once the blowers are placed in position on blower support arms (118), the blower support locking frame (114) is pulled toward the blower support pole (112) by use of the blower control pin (120) with handles (130), which passes through an opening (128) in the blower support pole, in a manner similar to that used to close the locking pole system (60). By pulling the blower support locking frame (114) toward the blower support pole (112), blower locking pins (116), secured to the blower support locking frame (114), pass over springs (126), through openings (122) in the blower support pole (112), and extend up to or close to the blower support arms (118), which are secured to the blower support pole (112) to hold the leaf blowers securely in position. If desired, cross braces (124) are secured to the blower support pole (112) by conventional means to better support the leaf blowers in position. Also, a locking system can be stylized to secure the blower support locking frame (114) to the blower support pole (112). In one embodiment this locking system includes a locking bar (132) secured to the blower support locking frame (114) with an opening (134) passing therethrough and a cooperating second locking bar (136) with an opening (138) passing therethrough. A lock (not shown) can be placed in the two openings (134, 138) to lock the frame (114) against the pole (112).

Once the trailer is in position for use, locks are removed from the various locking systems. The blower locking control pin (120) is then rotated which allows the blower support locking frame (114) to rotate away from the blower support pole (112) and open an opening created by the blower support arm (118) which will permit the leaf blowers to be removed from the blower rack system (110).

In a similar manner, the locking control pin (68) used with the locking pole system (60) can also be released after any lock is removed from the system. This permits the pins (66) to move and open up the support arms (72) for removal of the equipment stored on those support arms (72). At the same time, or concurrently therewith, any lock is removed from the hinged pole locking system (20). The hinged locking frame (24) is then rotated on its hinges (26) by use of the locking handle (32) away from the first vertical pole (22) to an open position which will open the support arms (28) for removal of the lawn equipment.

It will be apparent from the foregoing that while particular forms of the invention have been illustrated and described, various modifications can be made without departing from the spirit and scope of the invention.

We claim:

1. A storage system for storing lawn and garden equipment on a trailer comprising a hinged pole locking system and a locking pole system wherein the hinged pole locking system, which comprises a first vertical pole; a hinged locking frame, comprising an extended vertical bar; a hinge system rotatably securing the hinged locking frame to the first vertical pole, wherein the hinged system includes a first portion permanently affixed to said first vertical pole and a second portion permanently affixed to the extended vertical bar; and a support bar secured to the first vertical pole for supporting equipment, wherein each of the first vertical pole and the extended vertical bar are fixedly secured to the hinge system and wherein the locking pole system comprises a second vertical pole, a locking guide frame and a plurality of pins secured to the locking guide frame.

2. The storage system of claim 1 further comprising a plurality of locking bars secured to the hinged locking frame, and which locking bars cooperate with the support bars to lock a piece of equipment to the hinged pole locking system.

3. The storage system of claim 1 further comprising a locking handle secured to the hinged locking frame.

4. The storage system of claim 3 wherein the hinged pole locking system further comprises a slot element which operates in conjunction with the locking handle to secure the first vertical pole against the hinged locking frame.

5. The storage system of claim 1 wherein the hinged pole locking system further comprises a string trimmer spool bar.

6. The hinged pole locking system of claim 1 further comprising a cooler holder assembly secured to the first vertical pole.

7. The storage system of claim 1 wherein the locking pole system further comprises a locking control pin secured to the locking guide frame.

8. The storage system of claim 7 further comprising a locking system to lock the second vertical pole against the locking guide frame.

9. The storage system of claim 7 further comprising one or more support arms secured to the second vertical pole.

10. The storage system of claim 9 wherein the pins pass through openings in the second vertical pole to operate in conjunction with the support arms to form an opening for supporting lawn and garden equipment.

11. The storage system of claim 1 further comprising a locking blower rack system comprised of a blower support pole and a blower locking frame securable to the blower support pole.

12. The storage system of claim 11 wherein the locking blower rack system comprises a blower support pole, a blower support locking frame, a control pin secured to the blower support locking frame, a support arm secured to the blower support pole, and a locking pin which operates in conjunction with the support arm.

13. The storage system of claim 11 further comprising a blower cross-brace.

* * * * *